(12) United States Patent
Legros

(10) Patent No.: US 8,870,203 B2
(45) Date of Patent: Oct. 28, 2014

(54) VEHICLE LEAF SPRING TO AIR RIDE SUSPENSION CONVERSION ASSEMBLY

(75) Inventor: Paul Legros, Thunderbay (CA)

(73) Assignee: LBC Contracting, Ltd., Thunderbay, Ontario (CA)

( * ) Notice: Subject to any disclaimer, the term of this patent is extended or adjusted under 35 U.S.C. 154(b) by 265 days.

(21) Appl. No.: 12/689,281

(22) Filed: Jan. 19, 2010

(65) Prior Publication Data

US 2011/0175317 A1 Jul. 21, 2011

(51) Int. Cl.
*B60G 11/28* (2006.01)
*B60G 11/27* (2006.01)

(52) U.S. Cl.
CPC .......... *B60G 11/27* (2013.01); *B60G 2202/152* (2013.01); *B60G 2204/126* (2013.01); *B60G 11/28* (2013.01); *B60G 2204/43065* (2013.01); *B60G 2206/911* (2013.01)
USPC .............................. 280/124.116; 280/124.112

(58) Field of Classification Search
CPC ........................................................ B60G 9/003
USPC ....................... 280/124.116, 124.11, 124.111, 280/124.157, 124.16, 124.162, 124.163, 280/683, 677, 678, 680, 686
See application file for complete search history.

(56) References Cited

U.S. PATENT DOCUMENTS

| | | | | |
|---|---|---|---|---|
| 2,754,111 A | * | 7/1956 | Norrie | 267/189 |
| 2,998,244 A | | 8/1961 | Francis | |
| 3,285,621 A | * | 11/1966 | Turner, Jr. | 280/81.1 |
| 3,547,215 A | * | 12/1970 | Bird | 280/86.75 |
| 3,547,464 A | * | 12/1970 | Hans | 280/124.116 |
| 3,730,548 A | * | 5/1973 | Thaxton | 280/124.163 |
| 3,730,549 A | * | 5/1973 | Turner, Jr. | 280/86.5 |
| 3,773,347 A | * | 11/1973 | Traylor | 280/124.116 |
| 3,785,673 A | * | 1/1974 | Harbers et al. | 280/124.101 |
| 3,817,550 A | * | 6/1974 | Young | 280/680 |
| 3,850,445 A | * | 11/1974 | Borns et al. | 280/124.163 |
| 3,877,718 A | * | 4/1975 | Scanlon et al. | 280/86.5 |
| 3,966,223 A | * | 6/1976 | Carr | 280/124.128 |
| 4,000,913 A | * | 1/1977 | Gibson | 280/86.5 |
| 4,141,428 A | * | 2/1979 | Loeb | 180/349 |
| 4,166,639 A | * | 9/1979 | Taylor | 280/86.5 |
| 4,274,643 A | | 6/1981 | Hendrickson | |

(Continued)

*Primary Examiner* — Karen Beck
(74) *Attorney, Agent, or Firm* — Greer, Burns & Crain, Ltd.

(57) ABSTRACT

An air ride suspension assembly or kit useful when converting a leaf spring suspension arrangement on a motor vehicle having a solid rear axle to one supported by the conversion suspension assembly is disclosed. The two sets of leaf springs which are attached to both sides of the vehicle chassis and the axle are removed and replaced by first and second upper support arms which are secured to the pre-existing leaf spring attachment sites on the chassis. The leading end of first and second lower trailing arms are each pivotally connected to a corresponding upper support arm proximate the front end of each support arm, and in the intermediate section of each trailing arm, are attached to the underlying axle by pivot connection means which permits the axle to pivot at right angles to the trailing arms. First and second inflatable air bladders are disposed between each support arm and trailing arm combination at a location rearward of the pivot connection means. The air ride conversion assembly can be supplied as a kit which may or may not include a known inflation control system for controlling air flow into and out of the air bladders which can also be obtained separately from third party sources. The conversion system has particular appeal to owners of light trucks who routinely carry heavy loads in the truck bed.

14 Claims, 5 Drawing Sheets

(56) References Cited

U.S. PATENT DOCUMENTS

| | | | |
|---|---|---|---|
| 4,293,145 A * | 10/1981 | Taylor | 280/86.5 |
| 4,379,572 A | 4/1983 | Hedenberg | |
| 4,415,179 A * | 11/1983 | Marinelli | 280/124.116 |
| 4,504,080 A * | 3/1985 | VanDenberg | 280/86.5 |
| 4,518,171 A | 5/1985 | Hedenberg | |
| 4,553,773 A * | 11/1985 | Pierce | 280/676 |
| 4,568,094 A * | 2/1986 | Lovell | 280/6.151 |
| RE32,736 E * | 8/1988 | Lovell | 280/6.151 |
| 4,966,387 A | 10/1990 | White, IV | |
| 5,039,124 A * | 8/1991 | Widmer | 280/124.116 |
| 5,040,826 A * | 8/1991 | Lovell | 280/6.151 |
| 5,046,752 A | 9/1991 | Stephens et al. | |
| 5,230,528 A * | 7/1993 | Van Raden et al. | 280/86.5 |
| 5,335,932 A * | 8/1994 | Pierce | 280/788 |
| 5,366,237 A * | 11/1994 | Dilling et al. | 280/124.116 |
| 5,427,404 A | 6/1995 | Stephens | |
| 5,549,322 A * | 8/1996 | Hauri | 280/86.5 |
| 5,845,919 A * | 12/1998 | VanDenberg | 280/124.175 |
| 6,371,227 B2 * | 4/2002 | Bartlett | 180/24.02 |
| 6,508,482 B2 * | 1/2003 | Pierce et al. | 280/124.116 |
| 6,739,608 B2 * | 5/2004 | Warinner et al. | 280/124.163 |
| 7,036,834 B2 * | 5/2006 | Schluntz et al. | 280/124.128 |
| 7,077,408 B2 | 7/2006 | Hedenberg | |
| 7,178,817 B1 * | 2/2007 | Welles et al. | 280/124.128 |
| 7,192,032 B2 | 3/2007 | Dodd et al. | |
| 7,429,054 B1 * | 9/2008 | Turner | 280/124.128 |
| 7,581,741 B2 * | 9/2009 | Reineck | 280/124.17 |
| 7,938,416 B2 * | 5/2011 | Legros | 280/124.11 |
| 2006/0175775 A1 * | 8/2006 | Bolt et al. | 280/5.514 |
| 2006/0273540 A1 * | 12/2006 | Heron et al. | 280/124.116 |

* cited by examiner

VEHICLE LEAF SPRING TO AIR RIDE SUSPENSION CONVERSION ASSEMBLY

FIELD OF THE INVENTION

The field of the invention generally relates to a motor vehicle air ride suspension assembly, and more particularly, an air ride suspension assembly or kit useful when converting a leaf spring suspension arrangement which supports a solid rear axle of the motor vehicle to one supported by an air ride suspension assembly.

BACKGROUND OF THE INVENTION

Most conventional cars, pick-up trucks and SUV's having a solid rear axle employ a leaf-spring suspension system as the means of attaching a solid rear axle to the chassis of the vehicle. The spring rating is such that during normal usage, the vehicle chassis remains relatively level to the ground. When subjected to increased loading experienced at the rear axle of the vehicle, the springs permit the chassis to move downwardly towards the axle, and which can result in the front end of the vehicle chassis moving upwardly relative to its front wheels.

Motor vehicles which are equipped with an air ride suspension assembly used to support the solid rear axle to the vehicle chassis and which include an air ride control system for controlling the air flow into and out of the air bladders in the air ride suspension assembly are well known in the art, and serve to maintain the spacing between the axle and chassis at a predetermined distance, or within a predetermined range, regardless of the weight loading experienced by the rear axle. Air ride suspension assemblies of this nature characteristically avoid unwanted rear end depression of the vehicle chassis when undergoing or experiencing increased or heavy loading over the rear axle.

Despite the existence of air ride suspension systems, there exists a need by owners and operators of motor vehicles equipped with a conventional leaf spring suspension system, such as light trucks, to convert this known leaf spring suspension arrangement to one in which the existing solid rear axle of the vehicle is supported by an air ride suspension assembly exhibiting improved load handling, which is characteristic of air ride suspension systems.

SUMMARY OF THE INVENTION

In accordance with one aspect of the present invention, there is provided an air ride suspension assembly for converting a motor vehicle having a solid rear axle supported by a leaf spring suspension, to one supported by an air ride suspension assembly. The conversion assembly is made up of a first and second upper support arms which respectively include connector means at a front and rear end thereof for attaching the support arms to first and second pairs of leaf spring attachment sites on a chassis of said vehicle and wherein the attachment sites of each said pair are disposed forwardly and rearwardly of the vehicle axle. As is well known in the art, leaf spring attachment sites are commonly in the form of either a leaf spring attachment bracket or a leaf spring attachment post secured to the vehicle's frame or chassis.

First and second lower trailing arms, each having a leading and trailing end and an intermediate section, at their leading ends, are pivotally connected to a corresponding one of the first and second upper support arms proximate their said front ends. Pivot connection means is provided for respectively interconnecting the intermediate section of each of said first and second lower trailing arms to the axle of the vehicle when positioned thereabove, and for respectively permitting the axle to pivot at right angles to each of the said first and second trailing arms.

The conversion assembly of this invention can be supplied to customers in conversion kit form, and can be supplied either with or without an air ride control system for the required inflatable air bladders, and which can be obtained from third party supply sources. The assembly includes first and second inflatable air bladders which respectively interconnect a bottom surface of the first and second upper support arms to a top surface of corresponding first and second lower trailing arms at a location rearwardly of the pivot connection means, whereby each air bladder functions to increase and decrease the spacing between the respective upper support arms and lower trailing arms in accordance with the quantity of air contained in the bladders. To be functional, the assembly can include as part of the kit or separately obtained an inflation or air ride control system for controlling air flow into and out of the first and second bladders to maintain the spacing between the pairs of upper and lower arms within a predetermined range.

Advantageously, the pivot connection means included in the assembly and considered essential to the successful conversion of a solid rear axle supported by a leaf spring arrangement, which is normally made up from two sets of leaf springs, to one supported by an air ride suspension assembly, includes two connector plates disposed between each of said trailing arms and the axle housing and wherein each said connector plate has an upper surface pivotally connected to the bottom surface of each of the trailing arms and a pivot axis which parallels the longitudinal extent of each trailing arm, with the lower surface of each connector plate being adapted to engage an upper surface of the axle housing. Preferably, each connector plate is itself connected to the rear axle housing on either side of the differential by a pair of U-shaped bolts, the free ends of which extend through the connector plate.

Preferably, each connector plate on its upper surface, employing a hinge-like arrangement, can be pivotally connected to the under surface of an overlying upper plate which itself is fixedly attached to the bottom surface of each trailing arm, such as by way of welding.

In order to increase the spacing between each of the two of upper support arms which are respectively pivotally connected to a corresponding lower trailing arm, in the area where the inflatable bladders are located, the trailing end of each trailing arm, relative to its leading end and to its intermediate section, is stepped downwardly to thereby form a perch or platform for the inflatable bladder positioned thereabove, and to also increase the spacing between the two pairs of upper and lower arms in this area in order to accommodate the inflatable bladders.

BRIEF DESCRIPTION OF THE DRAWINGS

Embodiments of the present invention will now be described, by way of example only, with reference to the attached Figures, wherein.

DETAILED DESCRIPTION

Figure 1:
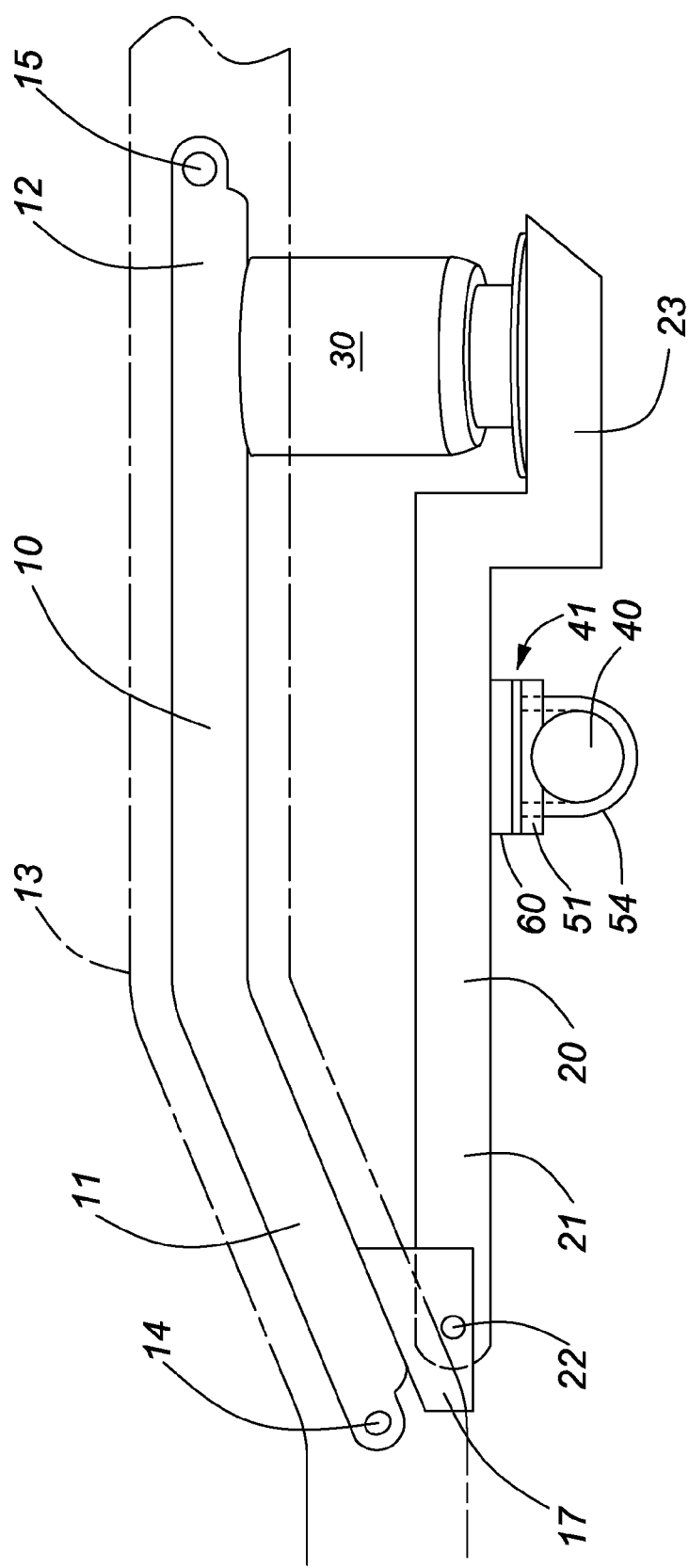
FIG. 1 illustrates a left hand side of the air ride suspension conversion assembly of this invention when attached to a vehicle frame and its underlying solid rear axle.

As the air ride conversion assembly of this invention is intended to replace pre-existing leaf spring suspensions on vehicles having solid rear axles, and which is normally made up of two sets of leaf springs, FIG. 1 illustrates the air ride suspension conversion arrangement when installed on the left hand side of a vehicle's chassis in replacement for the leaf spring assembly which has been removed. It will be apparent that the air ride suspension assembly on the right hand side of the vehicle is identical to that seen in FIG. 1.

The air ride replacement assembly for the left hand side of the vehicle is made up of upper support arm 10 having front end 11 and rear end 12, which as illustrated, are attached to the left hand side of the vehicle chassis or frame 13 (illustrated in broken line) by being secured thereto on leaf spring mounting posts 14 and 15. Advantageously, posts 14 and 15 can be the same posts as used to secure the left hand side set of leaf springs, which have been removed, to the chassis or frame 13.

Positioned below upper support arm 10 is lower trailing arm 20 which at its leading end 21 is pivotally attached at 22 to spaced apart flanges 17 forming part of upper support arm 10 proximate its front end 11 as illustrated. Both upper support arm 10 and lower trailing arm 20 are preferably fabricated from rectangular tubing as illustrated. The trailing end 23 of trailing arm 20 is stepped downwardly and serves as a bottom perch for inflatable air bag 30.

As also seen in FIG. 1, the underside of trailing arm 20 is fixedly attached to solid rear axle 40 by pivot connection means generally indicated at 41 in FIG. 1 and FIGS. 3a, 3b and 3c, and discussed in greater detail below with reference to FIG. 2.

Figure 2:
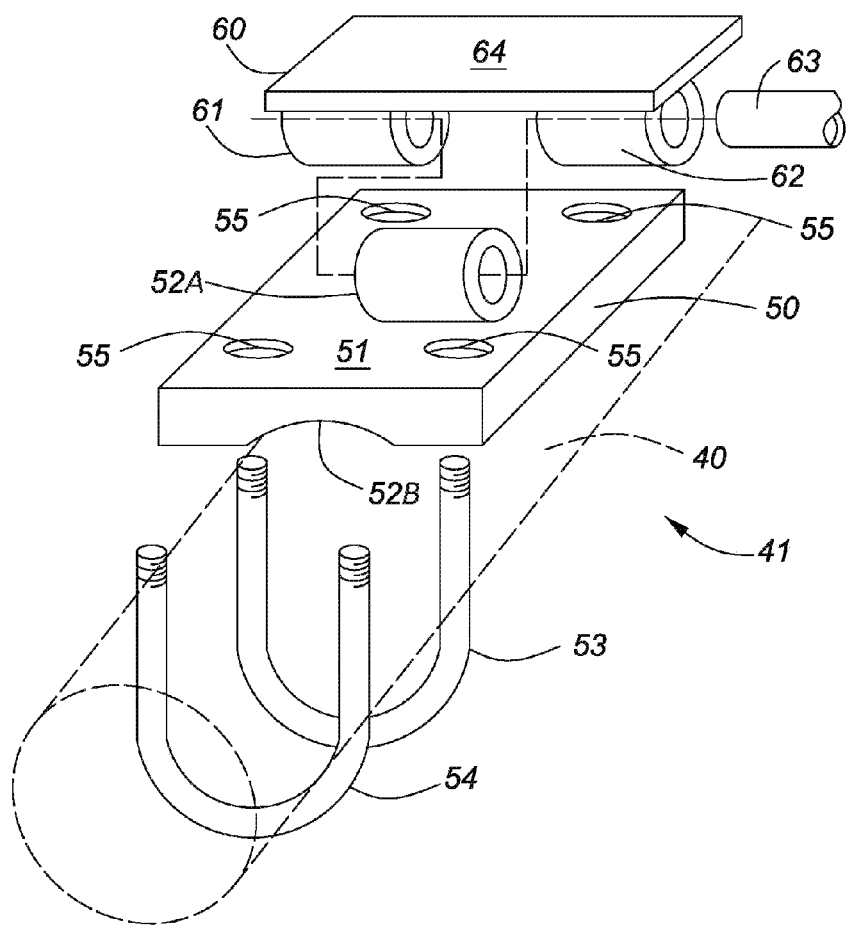
FIG. 2 is an exploded view of one of the pivot connection means employed when interconnecting each trailing arm to the vehicle's fixed rear axle.

Two pivot connectors are employed for securing trailing arms 20 on the left hand and right hand side of the vehicle to the housing of the solid rear axle 40 and is best illustrated in FIG. 2. Each pivot connection means includes a connector plate 50 which as shown, includes on its upper surface 51 or bushing 52A. The central bottom surface 52B of connector plate 50 is concave in order to engage in mating relationship with the upper surface of fixed rear axle housing 40. Connector plate 50 is secured in position on the fixed axle housing employing for that purpose U-shaped bolts or clamps 53 and 54 which engage the underside of fixed axle housing 40 and extend through apertures 55 in connector plate 50 and secured to it in a manner as is well known in the art, such as by way of lock washers and nuts, which are not illustrated in FIG. 2.

Positioned above connector plate 50 is upper plate 60 which on its underside has two spaced apart and axially aligned bushings 61 and 62, and when positioned in alignment with bushing 52A on connector plate 50, receive pivot pin 63 which extends through the bushings such that upper plate 60 is capable of pivoting over connector plate 50 about pivot pin 63 which joins the two together in fixed pivot or hinge-like relationship.

Figure 3A:
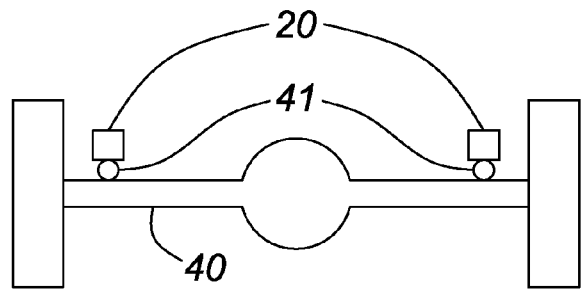
FIGS. 3a, 3b and 3c schematically illustrate the pivotal interconnection of the trailing arms to the solid rear axle of the vehicle when on level ground, and when experiencing bumps under the left and right hand side rear wheels.
Figure 3B:
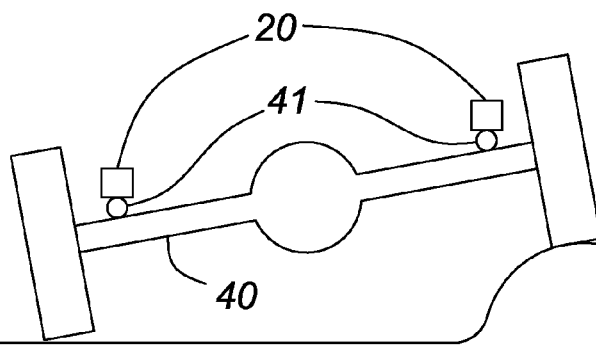
Figure 3C:
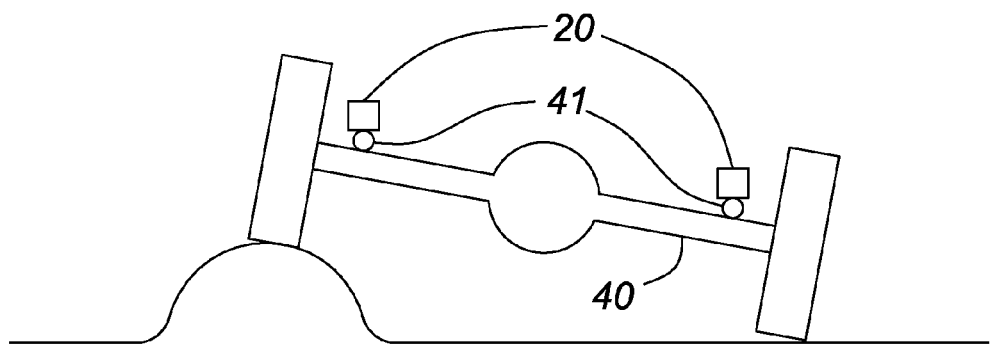

Although not illustrated in FIG. 2, the upper surface 64 of upper plate 60 is secured, preferably by welding, to the intermediate section of lower trailing arm 20 as best illustrated in FIG. 1. While not shown, it will be appreciated that the same pivot or hinge connection of connector plate 50 to the underside of lower trailing arm 20 can be obtained by dispensing with the upper plate 60 and welding bushings 61 and 62 directly to the underside of arm 20. The hinging of both the left and right hand trailing arms to the solid rear axle housing 40 in the manner illustrated, enables the solid rear axle to pivot at right angles to the trailing arms and is best illustrated in FIGS. 3a, 3b and 3c, where the rear wheels on the solid rear axle are shown on level ground and when the rear wheels encounter a bump on either the left or right hand side of the vehicle.

Figure 4:
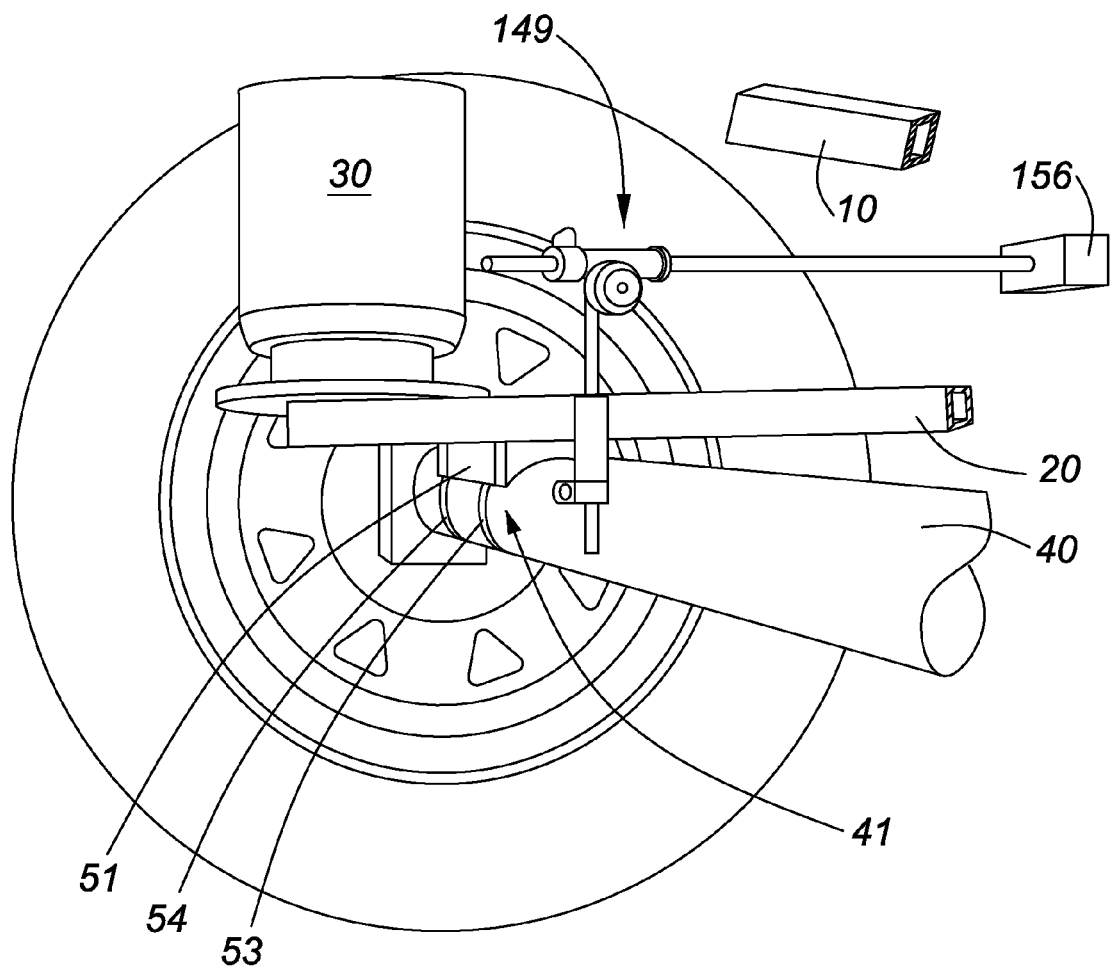
FIG. 4 illustrates a control mechanism for determining and maintaining the desired level of the air ride suspension system.

Shown in FIG. 4 is an element of a typical sensor system as known in the art and which can be used to determine if the vehicle ride height is maintained at a desired level. A connected pair of rods 149 is connected to a sensor 156. The pair of rods 149 is connected so that one of the rods is parallel to the trailing arm 20, and the other rod is fixedly mounted to either the trailing arm 20 or the axle 40. As is known in the art, sensor 156 is set to recognize an accepted neutral position, preferably one where, say, the bed of a truck is level. When the pressure in air bladder 30 is too high, the truck bed will be lifted above the level position. This will exert a downward pressure on the trailing arm 20, and will increase the angle between the trailing arm 20 and the upper support arm 10. This difference in angle will be mirrored in the connection of the pair of rods 149 to the sensor 156. Similarly, when the pressure in air bladder 30 is below the desired level, angle between the trailing arm 20 and the support arm 10 will be decreased. This decreased angle will be mirrored in the connection between the pair of rods 149 to the sensor 156. By detecting these differences in angles, sensor 156 can control the inflation and deflation of the air bladders 30. One skilled in the art will appreciate that this configuration is merely exemplary, and any number of other configurations can be employed, including the use of sensors that directly measure the distance between the trailing arm 20 and the truck bed, or sensors that directly measure the angle between the trailing arm 20 and the support arm 10. It should be noted that sensor 156 can be described as a ride height sensor.

Figure 5:
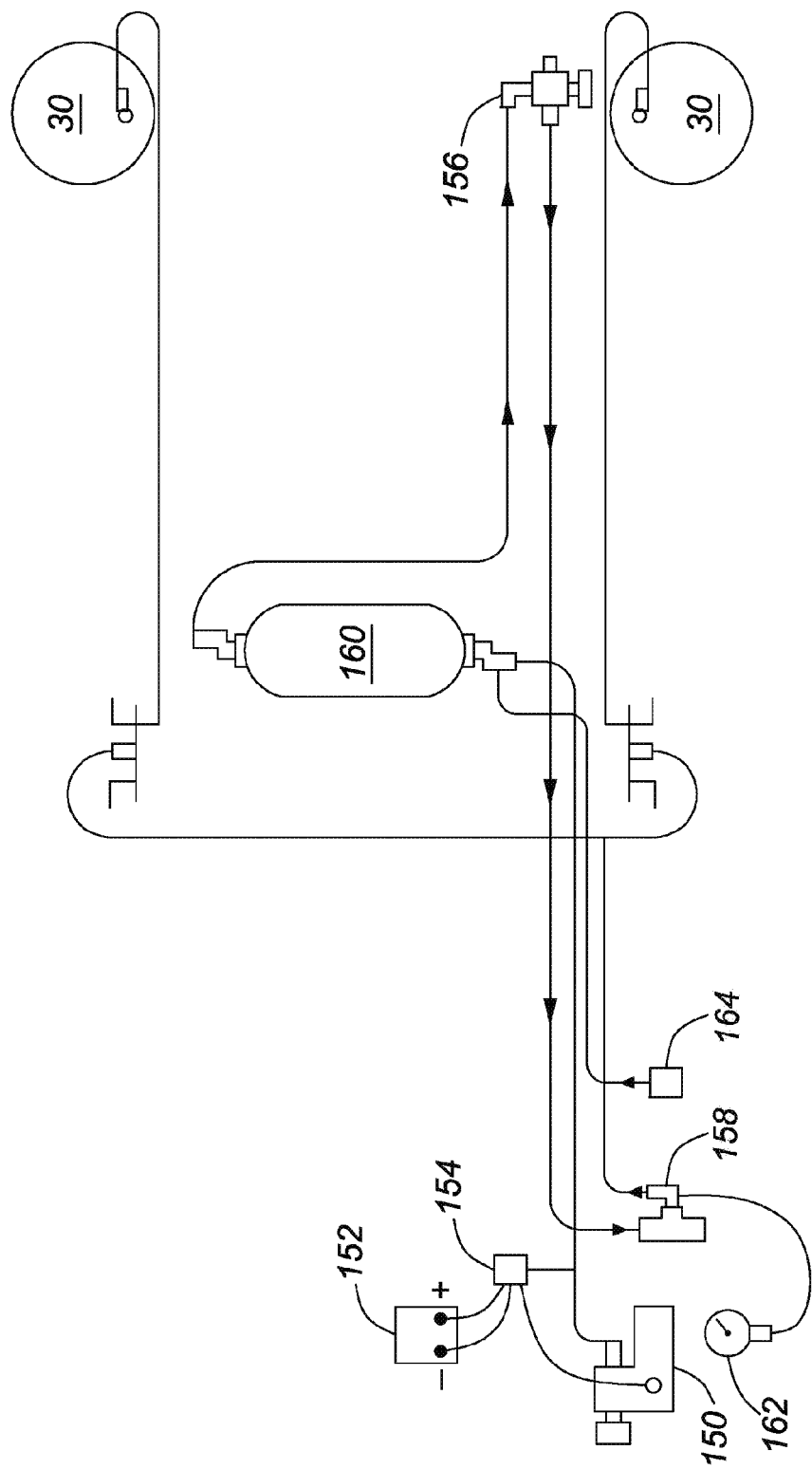
FIG. 5 schematically illustrates a typical prior art air ride control system.

FIG. 5 schematically illustrates a typical air ride control system suitable for use with the air ride conversion assembly of this invention, which can be sold with or separate from the conversion assembly, and which is used for controlling the vehicle level.

As disclosed in companion Published U.S. Application No. 2009/0261551 dated Oct. 22, 2009, air bladders 30 rely upon an air source, such as compressor 150, which draws power from a source 152 such as the vehicle itself. The connection between power supply 152 and compressor 150 is made through regulator 154 which in conjunction with sensor 156 determines whether air pressure should be maintained or increased. Sensor 156, in the presently illustrated embodiment, can be implemented as a levelling valve that can serve to increase or decrease the pressure in the air bladders 30 as needed. If a decrease in air pressure is required, levelling valve 156, can provide air bladders 30 with the means to exhaust air by putting the bladders 30 in fluid communication with the outside environment, thus allowing the bladders 30 to vent. The exhausting of air can be continued until the desired bed level is reached and the levelling valve 156 closes.

Between compressor 150 and the air bladders 30, is an air tank 160 that can be kept under pressure so that the inflation of the air bladders 30 can be performed quicker than would be possible if they were directly connected to air compressor 150. When using air tank 160, flow from the tank can be run through the sensor 156 to the dump valve 158 (which can be implemented as a three way ball valve). In such a configuration, the levelling valve 156 has three states, an inflation state, a maintenance state and a deflation state. The choice of states is controlled by the ride height as determined by levelling valve 156. The use of a single air passage to each of the air bladders 30 (through both levelling valve 156 and dump valve 158, for both inflation and deflation, results in an easier to install system. Dump valve 158 can be used to provide the user with the ability to control the ride height of the vehicle bed, or to control the air pressure in tank 160 when the system is powered down.

In operation, a sensor 156 determines whether the bed is at the desired level (ride height). The bed can be at the level, in which case, no changes to the air pressure in the air bladders is needed; it can be too high, in which case the air bladders 30 need to be deflated; or it can be too low in which case the air bladders 30 will need to be inflated. When sensor 156 determines the applicable state it selects between its three states. In a first state, a seal is effectively maintained, so that the air pressure in the bladders 30 is maintained. In a second state, the bladders 30 are put into fluid communication with the air tank 160, which is at a higher pressure than the bladders 30. The air in the system will seek to find equilibrium, and thus will flow to the air bladders 30, inflating them in the process. When the desired level has been reached, the sensor 156 will seal access to the bladders 30. In the third state, the air bladders are put into fluid communication with a lower pressure environment, which can be done by opening a valve to the open atmosphere. Once again, the air in the system will seek equilibrium, which in this case will empty the air bladders 30. In such a system the regulator 154 provides power to the compressor 150 from the power source 152 based on the air pressure in the tank 160. Dump valve 158 can be used to provide manual control of the pressure in various components of the system. In standard operation, dump valve 158 allows the air tank 160 to be in fluid communication with the air bladders 30, a communication controlled by sensor 156. However, when in a powered off state, the user may want to lower the bed of the vehicle which is achieved by venting the air bladders 30 to the atmosphere. In such a case, dump valve 158 can be used to empty the bladders 30. In some embodiments, dump valve 158 can also be used to vent pressurized air stored in tank 160 if so desired.

Additional control elements including check valves, shut off valves and couplers to allow the pressure in the air tank to be released can be provided. The use of these systems will be well understood by those skilled in the art.

Numerous different types of sensors can be employed as sensor 156. In the illustrated embodiments, a levelling valve is employed to allow for the creation of a simple pneumatic control system. This valve can be preset so that there is a desired level at which the bed of the trailer is to be maintained. When the bed of the trailer is not at this level, air pressure in the bladders 30 is increased or decreased accordingly. Optionally, an air gauge 162 can be employed to measure the pressure in the suspension system, which is directly related to the pressure in bladders 30. Because the weight of the bed in any given installation is constant, when the bed is level the pressure of the suspension system is directly proportional to the weight of the load carried by the vehicle. Thus an air gauge 162 can be employed to provide a rudimentary load scale on the vehicle.

Though described above as using a mechanical control system regulated by a levelling valve 156, the system of the present invention can be controlled through the use of an electronic control system that can be responsive to a number of different inputs, such as the height differential between the trailing arms 20 and the bed, the angle between the support arm 10 and the trailing arms 20, a direct measure of the ride height, or a manual input such as one set through external controller interface 164. Those skilled in the art will appreciate that the implementation of such a system does not depart from the scope of the present invention.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. An air ride suspension kit formed as a replaceable unit for converting a motor vehicle having a solid rear axle supported by a leaf spring suspension assembly to one supported by an air ride suspension assembly, said kit comprising:
   a) first and second upper support arms positioned above the axle, each support arm configured for removable attachment in a fixed non-adjustable predetermined location on one of a left side and a right side of a chassis of the motor vehicle;
   b) connectors at a front end and a rear end of each said first and second upper support arm, said connectors being configured to receive pre-existing leaf spring mounting posts and attach each said first and second upper support arm to the leaf spring mounting posts and disposed on the respective one of the left side and the right side of the chassis of said motor vehicle when leaf spring sets have been detached and removed from the leaf spring attachment sites and wherein the first and second leaf spring attachment sites are disposed on either side of one end of the axle;
   c) first and second lower trailing arms positioned above the axle, each of said trailing arms having a leading and trailing end and an intermediate section, said leading end of each of said first and second lower trailing arms being adjacent to and directly, pivotally connected to a corresponding one of said first and second upper support arms proximate each of their said front ends, the first and second leaf spring attachment sites disposed separately from said first and second lower trailing arms;
   d) pivot connection means for respectively interconnecting the intermediate section of each of said first and second lower trailing arms to the axle when positioned above the axle and for permitting the axle to pivot at right angles to each of said first and second trailing arms;
   e) first and second inflatable air bladders each including a first end and a second end, said first end of said first inflatable air bladder being connected to said first upper support arm and said second end of said first inflatable air bladder being connected to said first lower trailing arm, said first end of said second inflatable air bladder being connected to said second upper support arm and said second end of said second inflatable air bladder being connected to said second lower trailing arm thereby respectively interconnecting said first and second upper support arms to said first and second lower trailing arms at a location rearwardly of said pivot connection means whereby each of said first and second inflatable air bladders functions to increase and decrease the spacing between the respective upper support arms and lower trailing arms in accordance with the quantity of air stored in said bladders; and
   f) an inflation control system for controlling air flow into and out of the first and second air bladders to maintain said spacing within a predetermined range.

2. The kit as claimed in claim 1, wherein said pivot connection means interconnects a bottom surface of each of said first and second lower trailing arms to a housing of the axle.

3. The kit as claimed in claim 2, wherein said pivot connection means includes two connector plates disposed between each said trailing arms and said axle housing and wherein each said connector plate has an upper surface pivotally connected to the bottom surface of each of said trailing arms and a pivot axis which is parallel to the longitudinal extent of each said trailing arm, and a lower surface adapted to engage an upper surface of said axle housing.

4. The kit as claimed in claim 3, wherein each said connector plate is adapted to be connected to said axle housing by a pair of U-shaped bolts, the free ends of which extend through said connector plate.

5. The kit as claimed in claim 4, wherein said pivot connection means further includes two upper plates respectively fixedly attached to the bottom surface of said first and second trailing arms and which are respectively hingedly connected to the upper surfaces of said connector plates.

6. The kit as claimed in claim 1, wherein relative to the leading end and to the intermediate section of each of said trailing arms, the trailing end of said trailing arms are stepped downwardly and are respectively interconnected to said first and second inflatable air bladders.

7. The kit as claimed in claim 1 wherein said leaf spring attachment sites each comprise leaf spring attachment brackets, and wherein said leaf spring suspension assembly has exactly two connection sites to each frame member of the chassis.

8. An air ride suspension conversion assembly formed as a replaceable unit for replacing a leaf spring suspension assembly on a fixed rear axle of a motor vehicle, said conversion assembly comprising:
   a) first and second upper support arms positioned above the axle, each support arm configured for releasable attachment in a fixed non-adjustable predetermined location on one of a left side and a right side of a chassis of the motor vehicle, via connectors, said connectors being configured to receive pre-existing leaf spring mounting posts at a front end and a rear end of each said first and second upper support arm and attach each said support arm to the leaf spring mounting posts disposed on the respective one of the left side and the right side of the chassis of said motor vehicle when the leaf spring sets have been detached and removed from the leaf spring attachment sites and wherein the first and second leaf spring attachment sites are disposed either side of one end of the axle;
   b) a pair of lower trailing arms positioned above the axle, each of said lower trailing arms having a leading and trailing end and an intermediate section and wherein the leading end of each said pair of lower trailing arms is adjacent to and directly, pivotally attached to a corresponding one of said upper support arms proximate said front end, the first and second leaf spring attachment sites disposed separately from each said pair of lower trailing arms;
   c) pivot connection means for respectively interconnecting the intermediate section of each of said lower trailing arms to the axle when positioned thereabove and for permitting the axle to pivot at right angles to said trailing arms; and
   d) an inflatable air bladder having a first end and a second end, said first end being connected to one of said first upper support arm and said second upper support arm and said second end being connected to a corresponding one of said lower ailing arms, each of said inflatable air bladders being at a location rearward of said pivot connection means whereby each inflatable air bladder functions to increase and decrease the spacing between its related upper support arm and lower trailing arm in accordance with the quality of air contained in each said inflatable air bladder.

9. The conversion assembly as claimed in claim 8, wherein said pivot connection means interconnects a bottom surface of each said lower trailing arm to a housing of the axle.

10. The conversion assembly as claimed in claim 9, wherein said pivot connection means includes two connector plates disposed between each said trailing arms and said axle housing and wherein each said connector plate has an upper surface pivotally connected to the bottom surface of each of said trailing arms and a pivot axis which is parallel to the longitudinal extent of each said trailing arm, and a lower surface adapted to engage an upper surface of said axle housing.

11. The conversion assembly as claimed in claim 10, wherein each said connector plate is adapted to be connected to said axle housing by a pair of U-shaped bolts, the free ends of which extend through said connector plate.

12. The conversion assembly as claimed in claim 11, wherein said pivot connector means further includes two upper plates respectively fixedly attached to the bottom surface of each of trailing arms and which are respectively hingedly connected to the upper surfaces of said connector plates.

13. The conversion assembly as claimed in claim 12, wherein relative to the leading end and to the intermediate section of each of said trailing arms, the trailing end of said trailing arms are stepped downwardly and are respectively interconnected to one of said inflatable air bladders.

14. A method of converting a leaf spring suspension system of a fixed rear axle of a motor vehicle, the method comprising:
   removing first and second pairs of leaf springs from the fixed rear axle of the motor vehicle whilst leaving first and second pairs of leaf spring mounting posts in situ;
   and installing an air suspension kit formed as a replaceable unit, the air suspension kit comprising:
   a) first and second upper support arms positioned above the axle, each support arm being configured for attachment in a fixed non-adjustable predetermined location on one of a left side and a right side of a chassis of the motor vehicle, via connectors, said connectors being configured to receive the pre-existing leaf spring mounting posts at a front end and a rear end of each said first and second upper support arm and attach each said support arm to pre-existing first and second leaf spring attachment sites disposed on the respective one of the left side and the right side of the chassis of said motor vehicle when first and second leaf spring sets have been detached and removed from the leaf spring attachment sites and wherein the first and second leaf spring attachment sites are disposed either side of one end of the axle;
   b) a pair of lower trailing arms positioned above the axle, each of said lower trailing arms having a leading and trailing end and an intermediate section and wherein the leading end of each said pair of lower trailing arms is adjacent to and directly, pivotally attached to a corresponding one of said support arms proximate said front end, the first and second leaf spring attachment sites disposed separately from each said pair of lower trailing arms;

c) pivot connection means for respectively interconnecting the intermediate section of each of said lower trailing arms to the axle when positioned thereabove and for permitting the axle to pivot at right angles to said trailing arms; and
d) an inflatable air bladder having a first end and a second end, said first end being connected to one of said first upper support arm and said second upper support arm and said second end being connected to a corresponding one of said lower trailing arms, each of said inflatable air bladders being at a location rearward of said pivot connection means whereby each inflatable air bladder functions to increase and decrease the spacing between its related upper support arm and lower trailing arm in accordance with the quality of air contained in each said inflatable air bladder.

\* \* \* \* \*